J. P. BLOM.
DIFFERENTIAL DRIVE AND STEERING MECHANISM.
APPLICATION FILED NOV. 19, 1919.
1,362,076.
Patented Dec. 14, 1920.
2 SHEETS—SHEET 1.
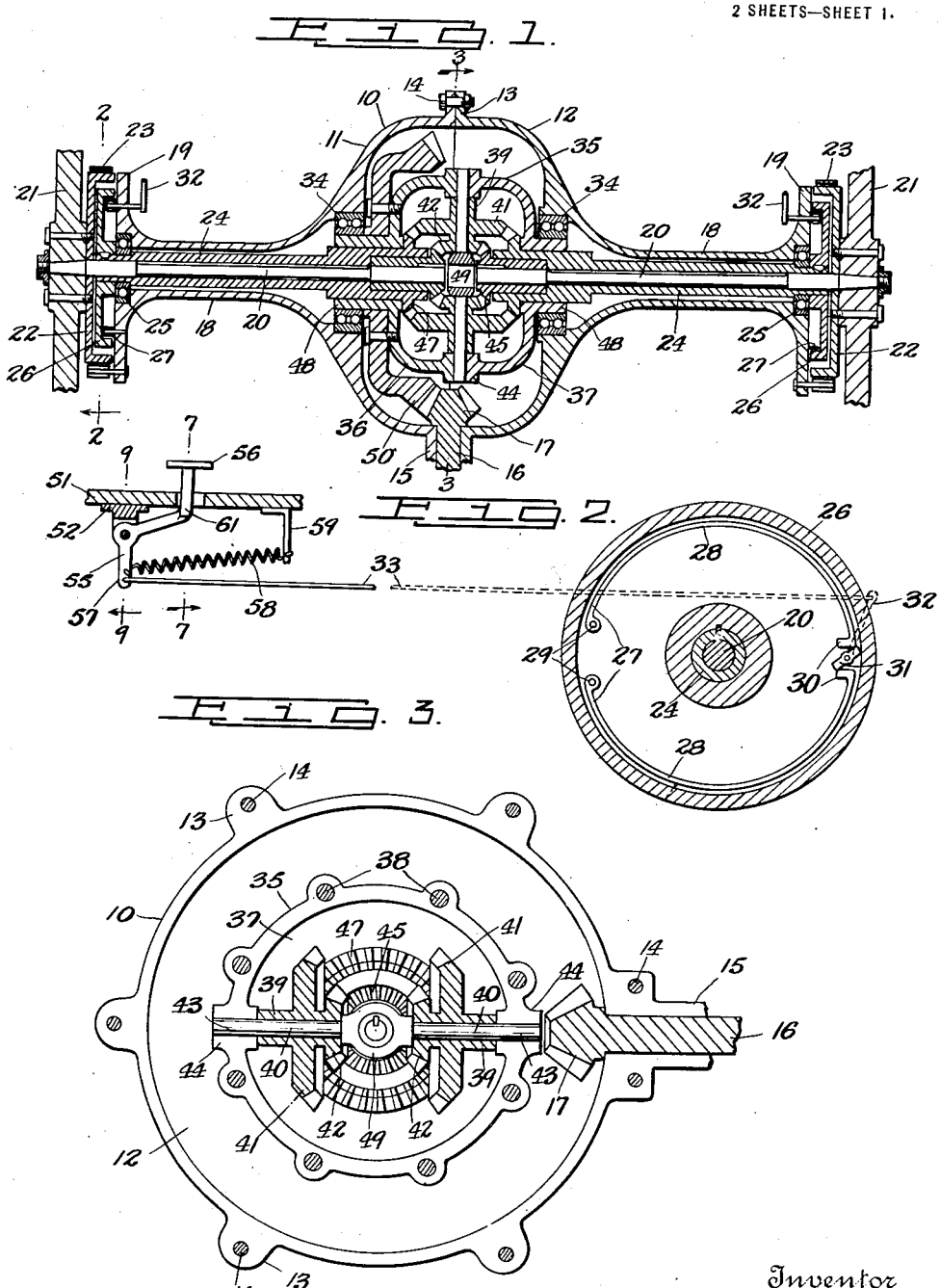
Inventor
John P. Blom,
By his Attorneys

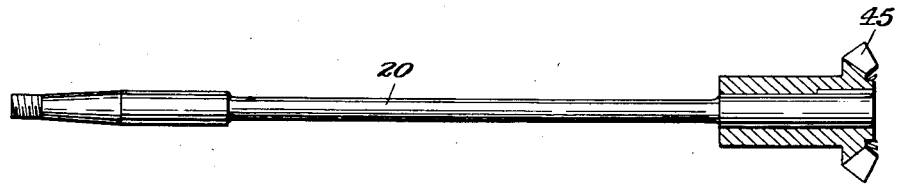
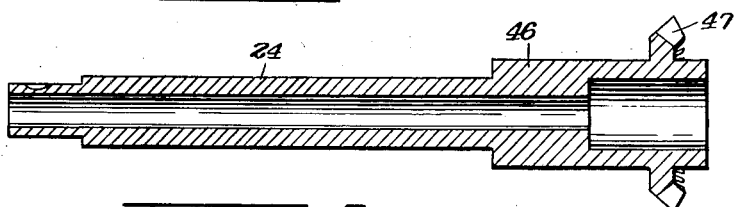
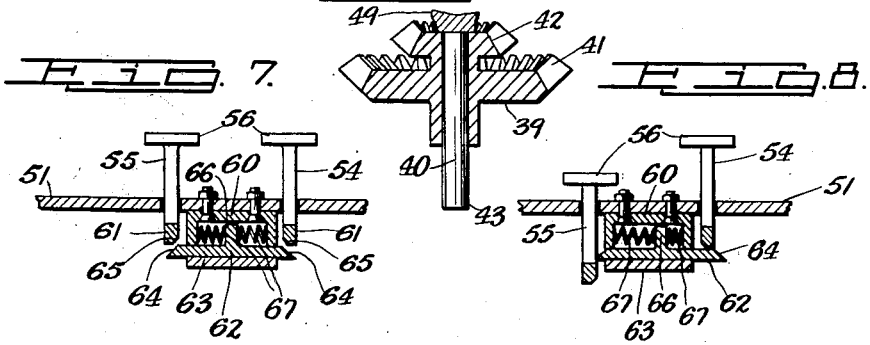
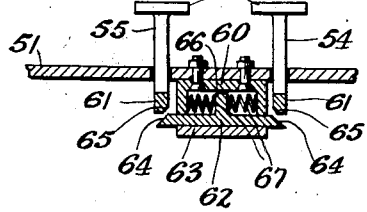
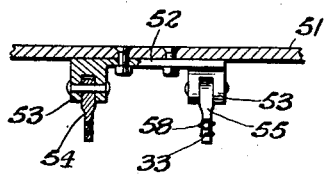

UNITED STATES PATENT OFFICE.

JOHN P. BLOM, OF NEW YORK, N. Y.

DIFFERENTIAL DRIVE AND STEERING MECHANISM.

1,362,076.

Specification of Letters Patent.  Patented Dec. 14, 1920.

Application filed November 19, 1919. Serial No. 339,165.

*To all whom it may concern:*

Be it known that I, JOHN P. BLOM, a citizen of Belgium, and residing at New York, in the county of New York and State of New York, have invented certain new and useful Improvements in Differential Drive and Steering Mechanisms, of which the following is a specification, such as will enable those skilled in the art to which it appertains to make and use the same.

This invention relates to differential drive and steering mechanism and is designed particularly for use in connection with motor vehicles, but may also be used in connection with other apparatus, and the object of the invention is to provide an improved gear construction of the class described which will operate in the same manner and produce the same result as mechanisms of the class specified which are now in use; and a further object being to provide improved means whereby one of the driven members or wheels may be rotated slowly, while the other of said driven members or wheels is rotated comparatively fast which result will facilitate the quick turning of a vehicle either to the left or to the right, the direction depending on which driven member or wheel is rotated slowly, and this result may be accomplished in either the forward or backward movement of such vehicle; and with these and other objects in view the invention consists in a differential gear mechanism of the class and for the purpose specified, constructed and operating as hereinafter described and claimed.

The invention is fully disclosed in the following specification, of which the accompanying drawings form a part, in which the separate parts of my improvement are designated by suitable reference characters in each of the views, and in which:—

Figure 1 is a central horizontal section through a differential housing such as is usually employed in motor vehicles and showing my improved differential construction;

Fig. 2 a diagrammatic sectional view on the line 2—2 of Fig. 1 and showing the construction by which the separate wheel operating members may be locked against rotation;

Fig. 3 a partial transverse section on the line 3—3 of Fig. 1 on an enlarged scale;

Fig. 4 a view similar to Fig. 1 but showing only a part of the construction and on an enlarged scale;

Fig. 5 a view similar to Fig. 4 but showing another part of the construction shown in Fig. 1 on an enlarged scale;

Fig. 6 a view similar to Fig. 1 but showing one of a number of gear devices which I employ on an enlarged scale;

Fig. 7 a partial section on the line 7—7 of Fig. 2;

Fig. 8 a view similar to Fig. 7 but showing parts in a different position; and,

Fig. 9 a partial section on the line 9—9 of Fig. 2.

In Fig. 1 of the drawing I have shown at 10 a differential housing composed of separate side parts 11 and 12, which are of approximately the same general form and construction. The abutting faces of the parts 11 and 12 are provided at intervals with ears 13 through which are passed bolts 14 which secure the separate parts 11 and 12 together and at one side of the housing 10 is a tubular extension 15 in which is mounted the drive shaft 16 of a vehicle, this shaft being driven by the engine, which is not shown, in the usual manner. The shaft 16 carries on its inner end a bevel gear 17.

The separate parts 11 and 12 of the housing 10 are each provided with tubular extensions 18 having enlarged disk-shaped flanges 19 at their outer ends. Mounted in the tubular extensions 18 are axle shafts 20 to the outer ends of which are secured the rear wheels 21 of the vehicle in the usual or any desired manner. At 22 I have shown the brake drums which are carried by the wheels 21 and in connection with which the usual brake bands 23 operate.

Rotatably mounted on the axle shafts 20 are supplemental tubular shafts 24 which have a bearing in the extensions 18 of the housing 10 as shown at 25. Secured to the outer or free ends of the tubular shafts 24 are supplemental brake drums 26 which rotate with the tubular shafts 24 freely within the brake drums 22. Mounted within the brake drums 26 are brake bands 27, which operate in connection therewith. One of the brake drums 26 and brake bands 27 is shown in Fig. 2, and the brake bands, as will be seen, consist of separate parts 28, one end portion of each of which is pivoted to the flanges 19 as shown at 29 in Fig. 2, and the free ends of said parts are provided with shoe portions 30 in connection with which cams 31 operate to expand the separate members 28 of the brake band into engagement with the inner walls of the brake drums 26.

The cams 31 are operated through levers 32 with which are connected operating rods 33.

Rotatably mounted within the housing 10 in bearings 34 is a supplemental rotatable housing 35 composed of separate parts 36 and 37 secured together at intervals by bolts 38, as indicated in Fig. 3. Mounted between the separate parts of the supplemental housing 35 are two similar gear devices 39, one of which is shown in detail in Fig. 6. These gear devices consist of central shafts 40, a large bevel gear 41 and small bevel gears 42. The protruding ends 43 of the shafts 40 operate in bearings 44 formed by the separate parts 36 and 37 of the housing 35.

Secured to the inner ends of the axle shafts 20, one of which is shown in detail in Fig. 4, are beveled gears 45 which mesh with the small bevel gears 42 of the gear devices 39, as clearly shown in Fig. 1. The tubular shafts 24, one of which is shown in detail in Fig. 5, are enlarged at their inner ends as shown at 46 and on said enlarged portions are bevel gears 47, which mesh with the large bevel gears 41 on the gear devices 39 as is also shown in Fig. 1. The enlarged portions 46 of the shafts 24 pass through and operate in bearings 48 in the separate parts 36 and 37 of the supplemental housing 35.

It will be noted that the shafts 40 of the gear devices 39 are joined by a central coupling block 49, and it will be apparent that these shafts, and the block 49 with the gear devices 39 will rotate with the supplemental housing 35 in the operation of the mechanism and said gear devices will rotate on said shafts.

Secured to the part 36 of the housing 35 is a large bevel gear 50, which meshes with the bevel gear 17 on the drive shaft 16 and by means of this construction, it will be seen that in the rotation of the shaft 16, the supplemental housing 35 will be rotated through the gears 17 and 15, as hereinafter set out.

In Figs. 2 and 7 to 9 inclusive, I have indicated at 51 a part of the floor or foot board in the front or driver's seat compartment of the vehicle. Secured to the bottom face of the floor 51 is a bracket 52 having two spaced bearing members 53 in which are pivotally mounted foot pedals 54 and 55, one end of each of said pedals projects out through the floor 51 and is provided with an enlarged head 56, and the other ends 57 of said pedals project downwardly, and the separate rods 33 are connected therewith. The pedals 54 and 55 are normally held in a raised position by springs 58 which are connected with the downwardly directed ends 57 of said pedals and with stationary supports 59 secured to the floor 51.

The casing 60 is secured to the bottom of the floor 51 between the pedals 54 and 55 or the elbow portions 61 thereof. Mounted within the casing 60 is a slidable lock plate 62 retained in the casing by a detachable cover 63 for said casing. The opposite ends of the plate 62 normally project through the casing 60 and are provided with beveled faces 64, as clearly shown in Figs. 7 and 8, and the elbow portion 61 of the pedals 54 and 55 are correspondingly beveled as shown at 65 and the last named bevels are adapted to operate in connection with the beveled ends 64 of the plate 62 to slide said plate in the casing 60 in the manner illustrated in Fig. 8 of the drawing. The plate 62 is provided centrally thereof with an upwardly directed member 66, and mounted within the casing 60 on the opposite sides of the member 66 are springs 67 which normally hold the plate 62 in its normal position as shown in Fig. 7.

The operation of my improved differential mechanism will be readily understood from the foregoing description when taken in connection with the accompanying drawings and the following statement. The normal position of the pedals 54 and 55 is that shown in Figs. 2 and 7 of the drawing, in which position the brake bands 27 are in their inoperative position as indicated in Fig. 2, and in this position of said parts the rotation of the drive shaft 16 by the engine of the motor vehicle through the usual gear shifting mechanism, not shown, will rotate the supplemental housing 35 through the gears 17 and 50. This operation will rotate the gear devices 39 about the gears 45 and 47 on the axle shafts 20 and tubular shafts 24 and the wheels 21 or other driving member will be rotated in the desired direction. In this last named operation it will also be apparent that both of the brake drums 22 and 26 will also be rotated. It will be apparent that the engagement of the gear devices 39 with the gears 45 and 47 will rotate said gears in the above operation.

In the movement of the vehicle, either forwardly or backwardly, if it be desired to make a turn to the right or to the left, one of the wheels 21 is locked against fast rotation by depressing one of the pedals 54—55 to bring the brake band 27 of said wheel into engagement with the brake drum 26 thereof to retard the action or rotation of the tubular shaft 24 to which said brake drum is secured and the result of this operation will permit of only a very slow turning of the axle shaft 20 within said tubular shaft 24, while the other axle shaft 20 will be turned comparatively fast, by reason of the ratio of gearing employed, and this ratio is preferably about three to one but, of course, may be four or five to one, if desired. The retarding or locking of the tubular shaft 24 which holds said shaft against rotation still permits of the rotary movement of the gear devices 39 thereover but, as will be seen, the axle shaft within the locked tubular shaft will be driven through the small gear 42 on the gear device 39 to drive the wheel on said axle shaft, while the wheel on the other axle shaft will be driven through the tubular shaft 24.

The result of the above operation will be that one wheel will remain practically at a standstill, while the other wheel turns comparatively fast and the first named wheel acts in the manner of a pivot. It will, therefore, be seen that with this construction it will be possible to more quickly and easily turn a motor vehicle out from a curb where a plurality of motor cars are compactly parked, and will also facilitate the making of sharp turns around corners or curved roadways with little or no danger of the upsetting of the vehicle.

It will also be understood on a consideration of Figs. 7 and 8 of the drawing that when one of the pedals 54—55 is depressed the other pedal is locked against depression by the projection of the corresponding end portion of the lock plate 62 beneath said pedal in the manner shown in Fig. 8. When the pressure on the depressed pedal is released, however, the spring 58 of such pedal will raise the same into its normal position and the springs 67 within the casing 60 will return the lock plate 62 into its normal position. By permitting of the depression of but one of the pedals 55, all possibility of breakage of the gear mechanism within the differential is obviated, and while I have shown a particular use of my improvement and certain details of construction for carrying the same into effect, it will be understood that various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A drive gear mechanism of the class described comprising a main housing, a supplemental rotatable housing mounted in the main housing, tubular shafts rotatably mounted in said main and supplemental housings, axle shafts mounted in said tubular shafts and the ends of which extend beyond said tubular shafts, driving members secured to the outer ends of said axle shafts, brake drums mounted on the outer end portions of said tubular shafts adjacent to said driving members, brake bands mounted in connection with the main housing and adapted to coöperate with said brake drums, means for rotating said supplemental housing, bevel gears on the inner ends of said axle shafts, large bevel gears on the inner ends of said tubular shafts, a plurality of gear devices rotatably mounted in and movable with said supplemental housing and coöperating with the gears on said axle shafts and tubular shafts whereby the rotation of said supplemental housing will rotate said axle shafts and tubular shafts to operate said driving members, and means for operating either of said brake bands to lock one of said tubular shafts against rotating whereby the axle shaft within the other tubular shaft will be rotated by the gear devices of the supplemental housing at a greater speed than the axle shaft within said locked tubular shaft.

2. A drive gear mechanism of the class described comprising a main housing, a supplemental rotatable housing mounted in the main housing, tubular shafts rotatably mounted in said main and supplemental housings, axle shafts mounted in said tubular shafts, driving members secured to the outer ends of said axle shafts, brake drums mounted on the outer end portions of said tubular shafts and in juxtaposition to said driving members, brake bands mounted in connection with the main housing and adapted to coöperate with said brake drums, means for rotating said supplemental housing, gears on the inner ends of said axle shafts, large gears on the inner ends of said tubular shafts, a plurality of gear devices rotatably mounted in and movable with said supplemental housing and coöperating with the gears on said axle shafts and tubular shafts whereby the rotation of said supplemental housing will rotate said axle shafts and tubular shafts to operate said driving members, means for operating either of said brake bands to lock one of said tubular shafts against rotating whereby the axle shaft within the other tubular shaft will be rotated by the gear devices of the supplemental housing at a greater speed than the axle shaft within said locked tubular shaft, and means whereby only one of said tubular shafts can be locked against rotation at one time.

3. A drive gear mechanism of the class described comprising a main housing, a supplemental rotatable housing mounted in the main housing, tubular shafts rotatably mounted in said main and supplemental housings and the outer ends of which extend through the ends of the main housing, axle shafts mounted in said tubular shafts and the outer ends of which extend beyond said tubular shafts, driving members secured to the outer ends of said axle shafts, brake drums mounted on the protruding end portions of said tubular shafts, brake bands mounted in connection with the end portions of the main housing and adapted to coöperate with said brake drums, means for rotating said supplemental housing, means on said tubular shafts and axle shafts and within said supplemental housing for rotating all of said shafts in the rotation of said supplemental housing, means for independently operating the separate brake bands to lock either of said tubular shafts against rotation, and means for preventing the locking of the other tubular shaft when one of said shafts is locked against rotation.

4. A drive gear mechanism of the class described comprising a main housing, a supplemental rotatable housing provided with oppositely directed tubular extensions mounted in bearings in the main housing, tubular shafts rotatably mounted in said main housing and the inner end portions of which extend into and are rotatably mounted in said supplemental housing and are provided with gears, axle shafts mounted in said tubular shafts and the inner ends of which are provided with gears within said supplemental housing, gear devices rotatably mounted in said supplemental housing and each of which consists of a pair of gears adapted to operate in connection with the gears on said tubular and axle shafts, and means for locking either one of said tubular shafts against rotation.

5. A drive gear mechanism of the class described comprising a main housing, a supplemental rotatable housing provided with oppositely directed tubular extensions mounted in bearings in the main housing, tubular shafts rotatably mounted in said main housing and the inner end portions of which extend into and are rotatably mounted in said supplemental housing and are provided with gears, axle shafts mounted in said tubular shafts and the inner ends of which are provided with gears within said supplemental housing, gear devices rotatably mounted in said supplemental housing and each of which consists of a pair of gears adapted to operate in connection with the gears on said tubular and axle shafts, means for rotating said supplemental housing, and means for locking either one of said tubular shafts at one time whereby the axle shaft within the free tubular shaft will rotate at a greater speed than the rotation of the axle shaft within the locked tubular shaft.

6. A drive gear mechanism of the class described comprising a main housing, a supplemental rotatable housing mounted in the main housing, a plurality of gear devices movable with and rotatably mounted in said supplemental housing tubular shafts rotatably mounted in said main and supplemental housings and the inner ends of which extend into said supplemental housing and are provided with gears which coöperate with said gear devices, axle shafts mounted in said tubular shafts and the inner ends of which extend into said supplemental housing and are provided with gears which coöperate with said gear devices, means for rotating said supplemental housings to cause said gear devices to rotate said tubular and axle shafts, and means for stopping the rotation of said tubular shafts to vary the relative speeds of said axle shafts through said gears and gear devices.

7. A drive gear mechanism of the class described comprising a main housing, a supplemental rotatable housing mounted in the main housing, a plurality of gear devices movable with and rotatably mounted in the supplemental housing, tubular shafts rotatably mounted in said main and supplemental housings, gears on the inner end portions of said tubular shaft and adapted to coöperate with larger gears on said gear devices, axle shafts rotatably mounted in said tubular shafts, gears mounted on the inner end portions of said axle shafts and adapted to operate in connection with gears on said gear devices, means for rotating the supplemental housing to cause said gear devices to rotate said tubular and axle shafts, and means for stopping the rotation of said tubular shafts to vary the relative speeds of said axle shafts through said gears and gear devices.

8. A drive gear mechanism of the class described comprising a main housing and tubular shafts rotatably mounted in said housing, a supplemental housing rotatably mounted in the main housing and on the inner end portions of said tubular shafts, and axle shafts mounted in said tubular shafts and the inner ends of which extend beyond said tubular shafts, driving members secured to the outer ends of said axle shafts brake drums mounted on the outer end portions of said tubular shafts, brake bands mounted in connection with the main housing and adapted to coöperate with said brake drums, means for rotating said supplemental housing, gears on the inner ends of said axle shafts, other gears on the inner ends of said tubular shafts, a plurality of gear devices rotatably mounted in and movable with said supplemental housing, and each of which consists of a pair of gears which coöperate with the gears on said axle and tubular shafts whereby the rotation of said supplemental housing will rotate said axle shafts and tubular shafts to operate said driving members.

In testimony that I claim the foregoing as my invention I have signed my name in presence of the subscribing witnesses this 15th day of November, 1919.

JOHN P. BLOM.

Witnesses:
TH. HERMANN,
H. E. THOMPSON.